US008260873B1

(12) United States Patent
Kandekar et al.

(10) Patent No.: US 8,260,873 B1
(45) Date of Patent: Sep. 4, 2012

(54) METHOD AND SYSTEM FOR GROUPING USER DEVICES BASED ON DUAL PROXIMITY

(75) Inventors: Kunal Kandekar, Morrisville, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 87 days.

(21) Appl. No.: 12/255,710

(22) Filed: Oct. 22, 2008

(51) Int. Cl.
*G06F 15/16* (2006.01)

(52) U.S. Cl. ........ 709/209; 709/203; 709/223; 709/238; 463/42

(58) Field of Classification Search ............... 463/42; 709/209, 203, 208, 223, 238, 243, 244; 345/666
See application file for complete search history.

(56) References Cited

U.S. PATENT DOCUMENTS

| 5,109,483 | A | | 4/1992 | Baratz et al. |
| 5,838,909 | A | * | 11/1998 | Roy et al. ............... 709/209 |
| 6,767,287 | B1 | * | 7/2004 | Mcquaid et al. ............ 463/42 |
| 6,912,565 | B1 | | 6/2005 | Powers et al. |
| 6,951,516 | B1 | | 10/2005 | Eguchi et al. |
| 7,065,553 | B1 | * | 6/2006 | Chesley et al. ............ 709/205 |
| 7,101,284 | B2 | * | 9/2006 | Kake et al. ............... 463/31 |
| 7,133,368 | B2 | * | 11/2006 | Zhang et al. ............. 370/249 |
| 7,181,690 | B1 | | 2/2007 | Leahy et al. |
| 7,244,181 | B2 | | 7/2007 | Wang et al. |
| 7,245,620 | B2 | | 7/2007 | Shankar |
| 7,269,632 | B2 | | 9/2007 | Edeker et al. |
| 7,421,708 | B2 | | 9/2008 | Vass et al. |
| 7,493,558 | B2 | | 2/2009 | Leahy et al. |
| 7,502,621 | B2 | * | 3/2009 | Lee ..................... 455/466 |
| 7,512,071 | B2 | | 3/2009 | Goldschmidt et al. |
| 7,685,224 | B2 | | 3/2010 | Nye |
| 7,688,761 | B2 | | 3/2010 | Paramaguru |
| 7,695,369 | B2 | * | 4/2010 | Winkler .................. 463/42 |
| 7,814,153 | B2 | | 10/2010 | Flesch et al. |
| 7,814,154 | B1 | | 10/2010 | Kandekar et al. |
| 7,831,707 | B2 | | 11/2010 | Bardsley |
| 7,887,418 | B2 | * | 2/2011 | Kaminagayoshi .......... 463/42 |
| 8,016,678 | B1 | * | 9/2011 | Hutter et al. ............. 463/42 |
| 8,075,403 | B2 | * | 12/2011 | O'Brien et al. ........... 463/42 |

(Continued)

FOREIGN PATENT DOCUMENTS

WO    WO 03/081447  A1    10/2003

OTHER PUBLICATIONS

Adwait Tumbde et al., "A Voronoi Partitioning Approach to Support Massively Multiplayer Online Games," (article), 2004, 8 pages, CS 740 Project, The University of Wisconsin, Madison.

(Continued)

*Primary Examiner* — Abdullahi Salad
*Assistant Examiner* — Jimmy H Tran
(74) *Attorney, Agent, or Firm* — Withrow & Terranova, PLLC

(57) ABSTRACT

A method and system for grouping user devices based on dual proximity. Avatars in a virtual environment are determined to be in virtual world proximity of one another. User devices associated with the avatars are determined to be in communications proximity of one another, and the user devices are grouped into a client cluster. One of the user devices is designated as a master client and the other user devices are designated as slave clients. Communications between the user devices in the client cluster and a server are handled by the master client. Lag and jitter are reduced or eliminated and network utilization is decreased.

19 Claims, 7 Drawing Sheets

U.S. PATENT DOCUMENTS

| | | | | |
|---|---|---|---|---|
| 2001/0040895 | A1* | 11/2001 | Templin | 370/466 |
| 2001/0052008 | A1 | 12/2001 | Jacobus | |
| 2002/0188678 | A1 | 12/2002 | Edecker et al. | |
| 2003/0177187 | A1 | 9/2003 | Levine et al. | |
| 2004/0002342 | A1* | 1/2004 | Goldberg et al. | 455/455 |
| 2004/0143852 | A1* | 7/2004 | Meyers | 725/133 |
| 2004/0152519 | A1 | 8/2004 | Wang et al. | |
| 2004/0215756 | A1* | 10/2004 | VanAntwerp et al. | 709/223 |
| 2005/0054447 | A1* | 3/2005 | Hiroyama et al. | 463/42 |
| 2005/0203922 | A1 | 9/2005 | Uhlir et al. | |
| 2006/0123127 | A1 | 6/2006 | Littlefield | |
| 2007/0184903 | A1 | 8/2007 | Liu et al. | |
| 2007/0186212 | A1 | 8/2007 | Mazzaferri et al. | |
| 2007/0270225 | A1 | 11/2007 | Wang et al. | |
| 2007/0271301 | A1 | 11/2007 | Klive | |
| 2007/0288598 | A1 | 12/2007 | Edeker et al. | |
| 2007/0294387 | A1 | 12/2007 | Martin | |
| 2008/0063002 | A1* | 3/2008 | Zheng et al. | 370/401 |
| 2008/0090659 | A1 | 4/2008 | Aguilar et al. | |
| 2008/0109519 | A1* | 5/2008 | Aaltonen et al. | 709/206 |
| 2008/0201321 | A1 | 8/2008 | Fitzpatrick et al. | |
| 2008/0207327 | A1 | 8/2008 | Van Luchene et al. | |
| 2009/0113421 | A1* | 4/2009 | Hamilton et al. | 718/1 |
| 2009/0124387 | A1* | 5/2009 | Perlman et al. | 463/42 |
| 2009/0141047 | A1* | 6/2009 | Bates et al. | 345/666 |
| 2009/0276707 | A1* | 11/2009 | Hamilton et al. | 715/716 |
| 2009/0325712 | A1* | 12/2009 | Rance | 463/42 |

OTHER PUBLICATIONS

Alvin Yun-Wen Chen, "A Hybrid Architecture for Massively Scaled Distributed Virtual Environments," (thesis), 2007, 68 pages, UCLA Multimedia Systems Laboratory, http://74.125.113.132/search?q=cache:hk3L8knLVxoJ:www.cs.ucla.edu/~alchemy/pubs/prospectus.pdf+%22Chen%22+%22Hybrid+Architecture+*+Massively%22&hl=en&ct=clnk&cd=1&gl=us.

Amjad Akkawi et al., "A Mobile Gaming Platform for the IMS," (article), 2004, pp. 77-84, In SIGCOMM'04 Workshops, ACM, http://conferences.sigcomm.org/sigcomm/2004/workshop_papers/net501-akkawi.pdf.

Bjorn Knutsson et al., "Peer-to-Peer Support for Massively Multiplayer Games," (article), Mar. 2004, 12 pages, In the 23rd Conference of the IEEE Communications Society (INFOCOM '04), Hong Kong, China.

Jean-Sebastien Boulanger, "Comparing Interest Management Algorithms for Massively Multiplayer Games," (article), Oct. 30-31, 2006, Proceedings of 5th ACM SIGCOMM Workshop on Network and System Support for Games,Singapore.

Jouni Smed et al., "A Review on Networking and Multiplayer Computer Games," (article), Apr. 2002, pp. 30, Technical Report No. 454, Turku Centre for Computer Science.

No Author, Main Page—Solipsis, (website), obtained Feb. 6, 2007, 2 pages, http://solipsis.netofpeers.net/wiki2/index.php/Main_Page.

Mojtaba Hosseini et al., "Visibility-based Interest Management in Collaborative Virtual Environments," (article), Sep. 30-Oct. 2, 2002, pp. 143-144, Proceedings of the 4th international conference on Collaborative virtual environments, Bonn, Germany.

No Author, "Multiverse Technology: An Overview," (article), 2005, 12 pages, http://www.multiverse.net/platform/whitepapers/mv_overview.pdf.

Paul Beskow et al., "Latency Reduction in Massively Multi-player Online Games by Partial Migration of Game State," (article), Sep. 4-7, 2007, 10 pages, Second International Conference on Internet Technologies and Applications.

Shun-Yun Hu et al., "Scalable Peer-to-Peer Networked Virtual Environment," (article), Aug. 2004, pp. 129-133, in Proc. 3rd ACM SIGCOMM 2004 workshops on NetGames '04.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

No Author, "Uni-verse Home," (website), obtained Mar. 19, 2007, 4 pages, www.uni-verse.org.

Shun-Yun Hu et al., "VON: A Scalable Peer-to-Peer Network for Virtual Environments," (article), Jul./Aug. 2006, pp. 22-31, vol. 20, issue 4, IEEE Network.

De Oliveira, Jauvane C. et al., "Velvet: An Adaptive Hybrid Architecture for VEry Large Virtual EnvironmenTs," (article), Dec. 2003, v. 12 No. 6, pp. 555-580.

Tanin, E. et al., "A Serverless 3D World," Proceedings of the 12th Annual ACM International Workshop on Geographic Information Systems, Nov. 12-13, 2004, ACM, New York, NY, 9 pages.

Schmalstieg, D. et al., "Sewing Worlds Together With SEAMS: A Mechanism to Construct Complex Virtual Environments," 1999, 16 pages.

Gehrmann, H., "P2P Based Distributed Virtual Reality. TerraPeer—a DVE Architecture and Implementation," Feb. 2004, Institute of Informatics and Mathematical Modeling, Technical University of Denmark (DTU), 200 pages.

Tanin, E. et al., "Building and Querying a P2P Virtual World," Geoinformatica, Mar. 2006, vol. 10, No. 1, Kluwer Academic Publishers, Hingham, MA, 22 pages.

* cited by examiner

METHOD AND SYSTEM FOR GROUPING USER DEVICES BASED ON DUAL PROXIMITY

FIELD OF THE INVENTION

This invention relates generally to virtual world environments, and in particular to grouping user devices for message distribution based on dual proximity.

BACKGROUND OF THE INVENTION

Video games and other simulators that feature a virtual environment, such as a virtual world, are increasingly popular. Simulators typically feature a computer-generated landscape that may represent an actual or imaginary location in a past, present, or future time. Simulator players, or users, can create computer-generated characters, referred to as avatars, and control the avatars in the landscape through client software that runs on a computing device. An avatar can typically roam the landscape and interact with other users' avatars and with other computer-generated objects. Virtual worlds are frequently implemented in a distributed computing environment where server software running on certain computers execute certain aspects of the simulator, and client software executing on user devices, such as personal computers, execute other aspects of the simulator.

One function typically managed by a server in such simulators is to ensure that each user device is aware of changes that are continually occurring in the area of the virtual world in which their respective avatar is located. For example, if a user manipulates his avatar in the direction of a second avatar, the user associated with the second avatar should see the first avatar moving across the virtual world toward the second avatar. Movement of avatars is communicated between user devices by messages transmitted from the user device responsible for manipulating the avatar to the server, and then from the server to the user devices that must be made aware of the movement of the avatar.

One problem that can arise while participating in a virtual world relates to choppy, or time delayed, movement of avatars in the virtual world. This phenomenon is commonly referred to as lag. Lag can occur for a number of reasons, including, for example, a lack of processing power in a client or a server, unreliable or slow network communications that inhibit the timely distribution of messages, or the wide variation in network speeds of the networks that couple the user devices to the server. Another related phenomenon is 'jitter.' Jitter relates to irregularity of message delivery. Irregular message delivery can result in a loss of synchronicity among avatars. Lag and jitter are disruptive in a simulator, and can even cause users to terminate their participation in the simulation.

Virtual world simulators are frequently enjoyed by individuals in group environments. It is common for several users to meet at a particular location, such as the home of one of the users, and play a virtual world simulator on separate user devices while in the same physical location. Lag and jitter can be particularly noticeable in these situations because the time delayed movements of avatars is more noticeable when a user can see multiple user devices at once. Moreover, it is likely that the users will direct their avatars to a common area of the virtual world, and the lag and jitter will become even more apparent in such situations. Thus, there is a need to minimize or eliminate lag and jitter in such situations.

SUMMARY OF THE INVENTION

The present invention reduces network lag and jitter, and minimizes network traffic in situations where avatars used in simulators are in virtual world proximity of each other and associated user devices are in communications proximity of each other. A determination is made that avatars located in a virtual world environment are within a particular virtual world distance from one another. The virtual world distance can be, for example, a particular predetermined distance from one avatar to another, can be defined by a predetermined radius of a circle, or can be based on which zones, or regions, of the virtual world in which the avatars are interacting. A determination is then made that certain of the avatars in virtual world proximity of one another are controlled by user devices that are in a real world distance, or communications proximity, of one another. Communications proximity can be determined by analyzing Internet Protocol (IP) addresses associated with the user devices, by information provided by global positioning satellite (GPS) devices associated with the user devices, or by analyzing the latency between user devices, for example.

Once it is determined that avatars are in virtual world proximity and that the associated user devices are in communications proximity, a server logically groups the user devices into a client cluster. The user devices that compose a client cluster can be referred to collectively as clustered devices. One of the clustered devices is designated a master device, and the other clustered devices are designated slave devices. The slave devices disconnect from the server and initiate connections with the master device. Messages, sometimes referred to as component messages, that are destined for the clustered devices are combined into a composite message and sent to the master device. The master device then sends the messages destined for the slave devices to the respective slave devices. Because a single path exists between the clustered devices and the server and due to the relatively low latency between the master device and the slave devices, message delivery to the clustered devices is sufficiently fast so that lag or jitter is minimized or eliminated.

The master device also receives component messages generated by the slave devices, consolidates those messages along with messages generated by the master device into a composite message, and sends the composite message to the server. The server separates the component messages generated by the clustered devices from the composite message, updates working tables as necessary, and forwards component messages as appropriate to other user devices that are not a part of the cluster. The master device can also forward component messages the master device receives from each slave device to the other slave devices without interaction with the server to further reduce network traffic between the server and the clustered devices.

According to one embodiment of the present invention, the master device separates the component messages from the composite message received from the server and individually sends the respective data designated for the respective slave devices in separate transmissions. According to another embodiment of the present invention, the master device multicasts the composite message to the slave devices, and the slave devices separate the component messages from the composite message and determine which components were destined for that respective slave device. The master device may be connected with the slave devices using wired or wireless technologies. If the master device and the slave devices are sufficiently physically proximate to one another, the master device can be connected with the slave devices by a high speed wireless technology, such as Wi-Fi or Bluetooth.

According to one embodiment of the present invention, the user devices determine that associated avatars are in virtual world proximity and identify such proximity to the server.

The server then determines whether the user devices are in communications proximity. According to another embodiment of the present invention, the server determines both the virtual world proximity of avatars and the communications proximity of user devices. The user devices or the server can repeatedly verify that the avatars associated with clustered devices are in virtual world proximity of each other, and that the user devices are in communications proximity of each other. Upon a determination that an avatar is no longer in virtual world proximity of other avatars associated with clustered devices, or that a user device is no longer in communications proximity of other clustered devices, the user device associated with the avatar can terminate its connection to the master device and reconnect to the server.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims. The term 'or' is used throughout the specification as an inclusive disjunction.

Unless explicitly stated otherwise, the method embodiments described herein are not constrained to a particular order or sequence. Additionally, some of the described method embodiments or elements thereof can occur or be performed at the same point in time.

The present invention can be used in a virtual world simulator environment to reduce network traffic between a server and a group of user devices, referred to herein as clustered devices, that are determined to be in communications proximity of one another, and whose associated avatars are determined to be in virtual world proximity of one another. The present invention eliminates or reduces lag and jitter experienced by users, resulting in a more enjoyable gaming experience. The present invention also reduces the processing load on a server used in a virtual world simulator environment by offloading certain processing from the server to the user devices, such as distribution within the cluster of certain messages generated by the clustered devices.

Figure 1:
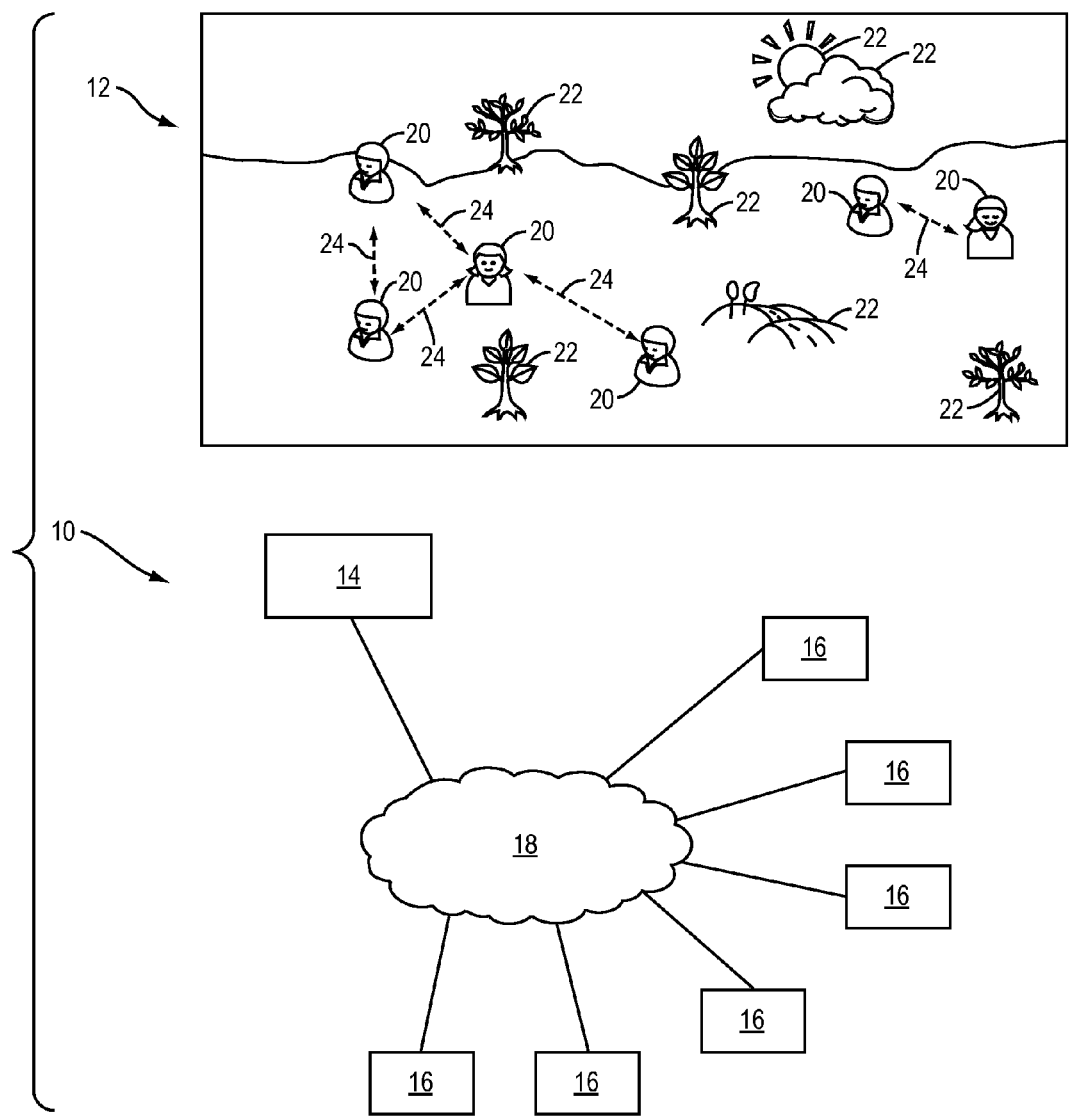
FIG. 1 is a diagram illustrating a distributed network and a virtual environment according to one embodiment of the present invention.

Referring now to FIG. 1, a diagram illustrating a distributed network 10 and a virtual environment 12 according to one embodiment of the present invention is shown. The distributed network 10 includes a server 14 and user devices 16, all of which are in network communication with each other via a network 18. The server 14 can comprise any suitable processing device, such as a computer, that is capable of executing aspects of the virtual environment 12 as described herein. The server 14 typically includes a central processing unit (CPU), random access memory (RAM), and storage. While the server 14 will be discussed herein in the singular for purposes of convenience and illustration, the virtual environment 12 may be implemented on a plurality of servers 14, and various architectures, including a client-server architecture or a peer-to-peer architecture, can be used to implement the virtual environment 12.

The user devices 16 can comprise any suitable user devices capable of executing software programs, such as general purpose computers, specialized gaming devices, such as the Nintendo DS or the Sony Playstation PSP, a personal digital assistant (PDA), or a smart phone, such as the Apple iPhone. The network 18 can comprise any suitable network or combination of networks, such as a local area network (LAN) or a wide area network (WAN), and can use any combination of communication technologies, such as wired or wireless technologies. Messages or data described herein as being transferred between the server 14 and the user devices 16 and between the user devices 16 can use conventional network protocols, such as Transmission Control Protocol/Internet Protocol (TCP/IP), or any suitable proprietary communications protocol.

The virtual environment 12 shown in FIG. 1 is a simplistic depiction of a virtual environment, or virtual world, that might be shown on one or more of the user devices 16. The virtual environment 12 includes computer-generated characters commonly referred to as avatars 20. Each avatar 20 is typically associated with a particular user device 16. Each of the user devices 16 includes client application software executing on the user device 16, which enables a user of the user device 16 to control, manipulate, or otherwise facilitate movement of its associated avatar 20 in the virtual environment 12. The virtual environment 12 also includes a plurality of virtual objects 22, which are computer-generated objects that may have static or dynamic behavior. In the course of participating in the virtual environment 12, the avatars 20 can interact with other avatars 20 or the virtual objects 22 while moving through the virtual environment 12.

For enjoyable simulation, it is important that the movement associated with the avatars 20 is relatively instantaneous with the corresponding actions of the user that caused such movement. Choppy or time-delayed movement of the avatars 20 is referred to as lag, and is undesirable. Lag can result from one or more technological issues, including varying network connection speeds between the user devices 16, varying processing capabilities of the user devices 16, a lack of capacity of one or more servers 14, or network outages or other problems in the network 18. Another related issue is jitter, which relates to irregularity of message delivery, and can result in a loss of synchronicity among the avatars 20. In severe situations, lag or jitter can be sufficiently problematic that users will quit participating in the simulator.

It is common for users of simulators that feature a virtual environment 12 to play the simulator together in a common location, such as the home of one of the users. Lag and jitter can be particularly noticeable in these situations because the time delayed movements of the avatars 20 is even more noticeable when a user can see the virtual environment 12 through multiple user devices 16 at the same time.

According to one embodiment of the present invention, a plurality of user devices 16 is logically grouped together into a client cluster upon a determination that the user devices 16 are in communications proximity of one another and that the avatars 20 associated with the respective user devices 16 are in virtual world proximity of one another. According to one embodiment of the present invention, virtual world proximity may be determined as a function of a virtual world distance between avatars 20. For example, as shown in FIG. 1, each of the avatars 20 is a virtual world distance 24 from other avatars 20. If the virtual world distance 24 between any two particular avatars 20 is sufficiently small that it is determined that the respective virtual world distance 24 between the two avatars 20 constitutes virtual world proximity, and the user devices 16 associated with the respective avatars 20 are in communications proximity, as discussed in greater detail below, then a determination can be made to cluster the respective user devices 16. Upon determining that such a client cluster should be created, one of the user devices 16 in the client cluster is determined to be a master device, and the remainder of the user devices 16 in the client cluster are determined to be slave devices. Messages between the server 14 and the clustered user devices 16 are sent through the master device. Because the latency between user devices 16 in communications proximity of one another should be relatively low, and because the messages destined for the user devices 16 in the client cluster are sent nearly simultaneously from the master device, lag and jitter are minimized or eliminated.

Figure 2:
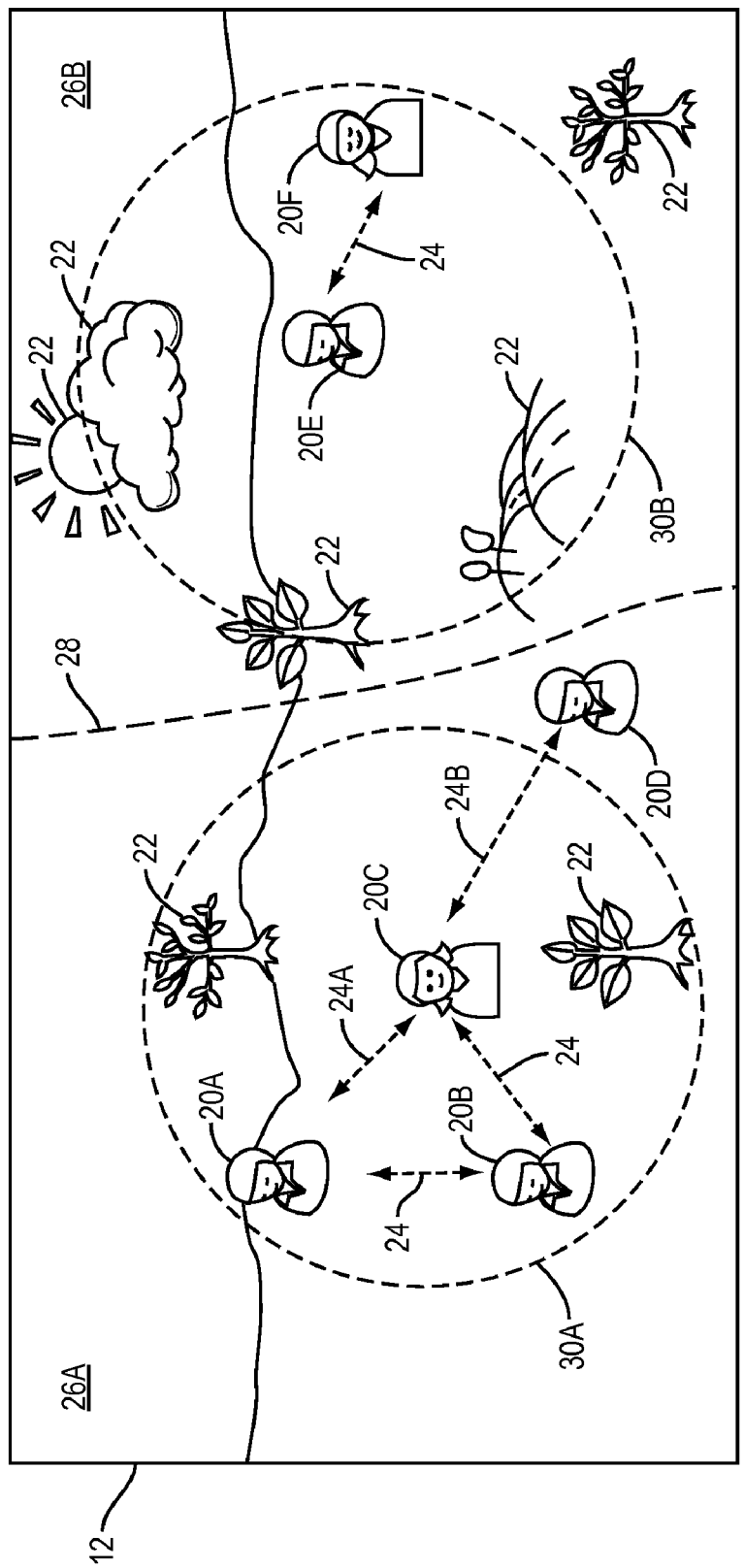
FIG. 2 is a diagram illustrating aspects of virtual world proximity according to one embodiment of the present invention.

FIG. 2 is a more detailed illustration of the virtual environment 12 shown in FIG. 1. The virtual environment 12 has a plurality of avatars 20A-20F. The avatars 20A-20F are a virtual world distance 24, respectively, from one another. Virtual worlds are frequently divided into different regions. Each region may be hosted by a separate server 14. The virtual environment 12 of FIG. 2 has two regions, region 26A and region 26B, separated by a region boundary 28. The existence of the regions 26A and 26B may be transparent to the users of the user devices 16 and the respective avatars 20. However, in determining virtual world proximity between avatars 20, it may be determined that, irrespective of how close two avatars 20 may be with respect to one another, if one avatar 20 is in one virtual world region 26A and another avatar 20 is in another virtual world region 26B, then such avatars 20 will not be in virtual world proximity. This may be due to the fact that different virtual world regions 26A and 26B are typically hosted by separate servers 14.

According to one embodiment of the present invention, virtual world proximity is determined through the use of zones. A zone may be a predetermined area or location in a virtual world region where it is determined that any avatar 20 in that zone will be determined to be in virtual world proximity of all other avatars 20 in that zone. For example, a particular room in a virtual world may be identified as a zone, and all avatars 20 in that room will be determined to be in virtual world proximity of one another. According to another embodiment of the present invention, virtual world proximity is determined as a function of a virtual world distance 24 between two avatars 20. For example, a ring, such as rings 30A and 30B, can be computed for avatars 20, such as the avatars 20C and 20E, respectively, and any other avatar 20 within the borders of the ring can be determined to be in virtual world proximity of the avatar 20 at the center of the ring. Thus, the avatars 20A, 20B, and 20C are in virtual world proximity of one another, and the avatars 20E and 20F are in virtual world proximity of one another.

Alternatively, the virtual world distance 24 may be a distance between two avatars 20. For example, the virtual world distance 24A between the avatar 20A and the avatar 20C may be determined to be small enough that the avatar 20A is in virtual world proximity of the avatar 20C. Similarly, the virtual world distance 24B between the avatar 20C and the avatar 20D may be small enough such that the avatar 20D is in virtual world proximity of avatar 20C.

Some virtual environments 12 permit the establishment of an instance, or party, that allows participants to form a group of avatars 20 that collaboratively explore or otherwise participate in a particular region of the virtual environment 12 by themselves. In such a virtual environment 12, those avatars 20 that form the instance, or party, might be determined to be in virtual world proximity of one another. According to another embodiment of the present invention, avatars 20 that are within an area of interest of one another may be considered to be in virtual world proximity to one another. As is known to those skilled in the art, an area of interest generally relates to a zone associated with an avatar 20 that defines the area within which the avatar 20 has the ability to perceive changes or events in the virtual environment 12.

The determination of virtual world proximity may be made by the server 14 or by the user devices 16. For example, the user devices 16 associated with the avatars 20A and 20B may determine that their associated avatars 20A and 20B, respectively, are in virtual world proximity of each other and may notify the server 14 of this situation. Alternately, the server 14 may analyze the virtual environment 12 and determine that certain avatars 20 are in virtual world proximity of other avatars 20.

Figure 3:
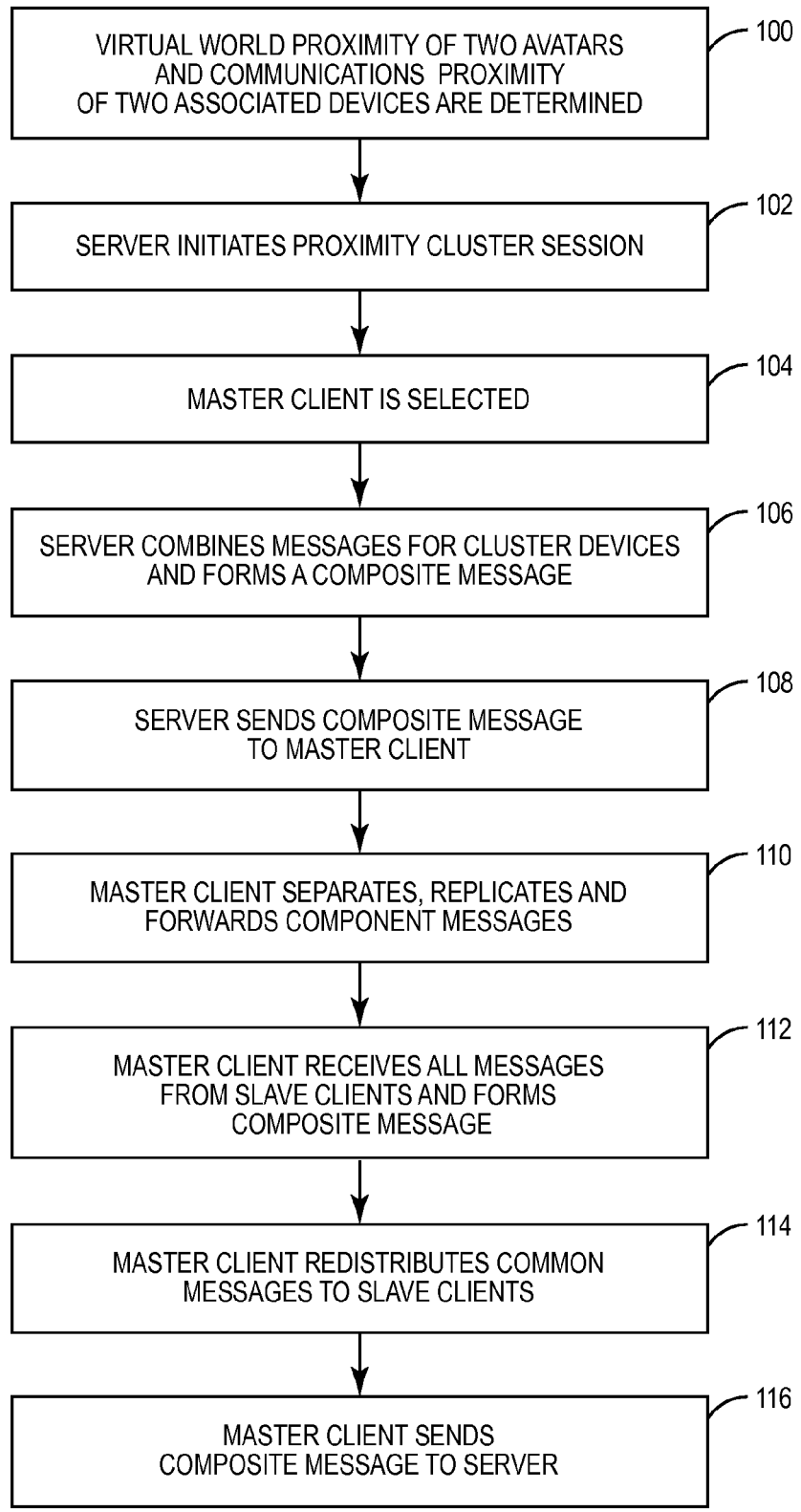
FIG. 3 is a flow diagram illustrating a process for grouping user devices based on dual proximity according to one embodiment of the present invention.

FIG. 3 is a flow diagram illustrating a process for forming a client cluster of user devices 16 based on dual proximity according to one embodiment of the present invention. Initially, virtual world proximity of two avatars 20 and communications proximity of two associated user devices 16 are determined (step 100). Methods for determining virtual world proximity are discussed above with reference to FIG. 2. Methods for determining communications proximity can comprise, for example, determining a latency between specific user devices 16, and determining that a latency below a predetermined threshold constitutes communications proximity. According to another embodiment of the present invention, the user devices 16 contain Global Positioning Systems (GPS), and location data generated by the GPS are used to determine physical proximity of the user devices 16. A physical proximity below a predetermined threshold is determined to constitute communications proximity.

According to other embodiments of the present invention, communications proximity can be determined via the use of local wireless technologies such as Wi-Fi or Bluetooth; via a local-link discovery protocol such as Bonjour; via sniffing packets on a local network associated with the user devices 16; via joining a multicast group with a low hop limit such that only nodes in a sub-network are discovered; via querying an internet service provider (ISP) or other external service; or via analyzing Internet Protocol (IP) addresses associated with the respective user devices 16.

Once it is determined that certain avatars 20 and associated user devices 16 are both in virtual world proximity and communications proximity, respectively, the server 14 initiates a proximity cluster session (step 102). The initiation of a proximity cluster session can include the generation of certain structures, or objects, that enable the server 14 to organize the user devices 16 into a logical cluster and create composite messages for the clustered user devices 16, as discussed in greater detail below.

One of the user devices 16 is designated to be a master client (step 104). The master client can be determined by the user devices 16 or by the server 14. Various methods can be used to determine which of the user devices 16 should be designated the master client. For example, the user device 16 having the greatest processing power, the lowest network latency, or the greatest amount of RAM, may be designated the master client. Alternately, the master client may be determined randomly. According to one embodiment of the present invention, network connection information associated with the user devices 16 is used to determine which of the user devices 16 should be the master client. The user device 16 having the fastest network connection is designated as the master client. The other user devices 16 are then designated as slave clients. Once the user devices 16 that are designated as slave clients are notified of such designation, the user devices 16 terminate their connections to the server 14 and initiate connections with the master client. The slave clients can use any suitable communications technology to connect to the master client. For example, the slave clients may be Bluetooth or Wi-Fi enabled and, if the master client is likewise Bluetooth and/or Wi-Fi enabled, the connections between the master client and the slave clients may be via either a Bluetooth or a Wi-Fi connection. Alternately, the connection between the master client and the slave clients may be a common wired Ethernet connection.

Once the client cluster is formed, the server 14 no longer sends messages destined for the slave clients directly to the slave clients. Instead, the server 14 combines messages designated for the slave clients and messages designated for the master client into a single composite message (step 106). The server 14 then sends the composite message to the master client (step 108). The use of composite messages reduces overall network bandwidth because a plurality of smaller messages share the same packet header, and duplicate messages, as discussed in greater detail below, can be eliminated. The master client receives the composite message and separates the component messages destined for the individual slave clients from the composite message. The master client also replicates the component messages, where necessary, and forwards the component messages to the slave clients identified in the composite message (step 110). By forwarding the component messages, it is intended that the master client sends the data intended for the respective slave client to the slave client, in one manner or another. The master client may merely extract a component message from the composite message and forward the component message to the slave client, or alternately extract relevant portions of the data from the component message and forward the relevant portions in a new message. In an alternate embodiment, the master client merely forwards the composite message to the slave clients, and the slave clients receive the composite message and determine from the composite message the component messages intended for the respective slave client.

The master client receives messages from the slave clients and forms a composite message (step 112). The master client also redistributes such messages to the slave clients that did not originate the respective message (step 114). Such local redistribution of messages among the slave clients eliminates the need for the server 14 to send such messages to the slave clients, and further reduces network traffic and processing requirements of the server 14. The master client then sends the composite message to the server 14 (step 116).

According to one embodiment of the present invention, the server 14 and the master client collect messages destined for each other over a period of time, referred to as a 'round.' A round is typically a predetermined amount of time during which messages are collected prior to being forwarded. Thus, the server 14 and the master client collect messages over the course of a round, form a composite message, and send the composite message to the other device. The server 14 or the user devices 16 preferably repeatedly verify that the associated avatars 20 remain in virtual world proximity of one another and the user devices 16 remain in communications proximity of one another. If either type of proximity changes such that either the avatars 20 are no longer in virtual world proximity or the user devices 16 are no longer in communications proximity, the user device 16 will separate from the cluster, terminate its connection to the master client, and reconnect to the server 14.

Figure 4:
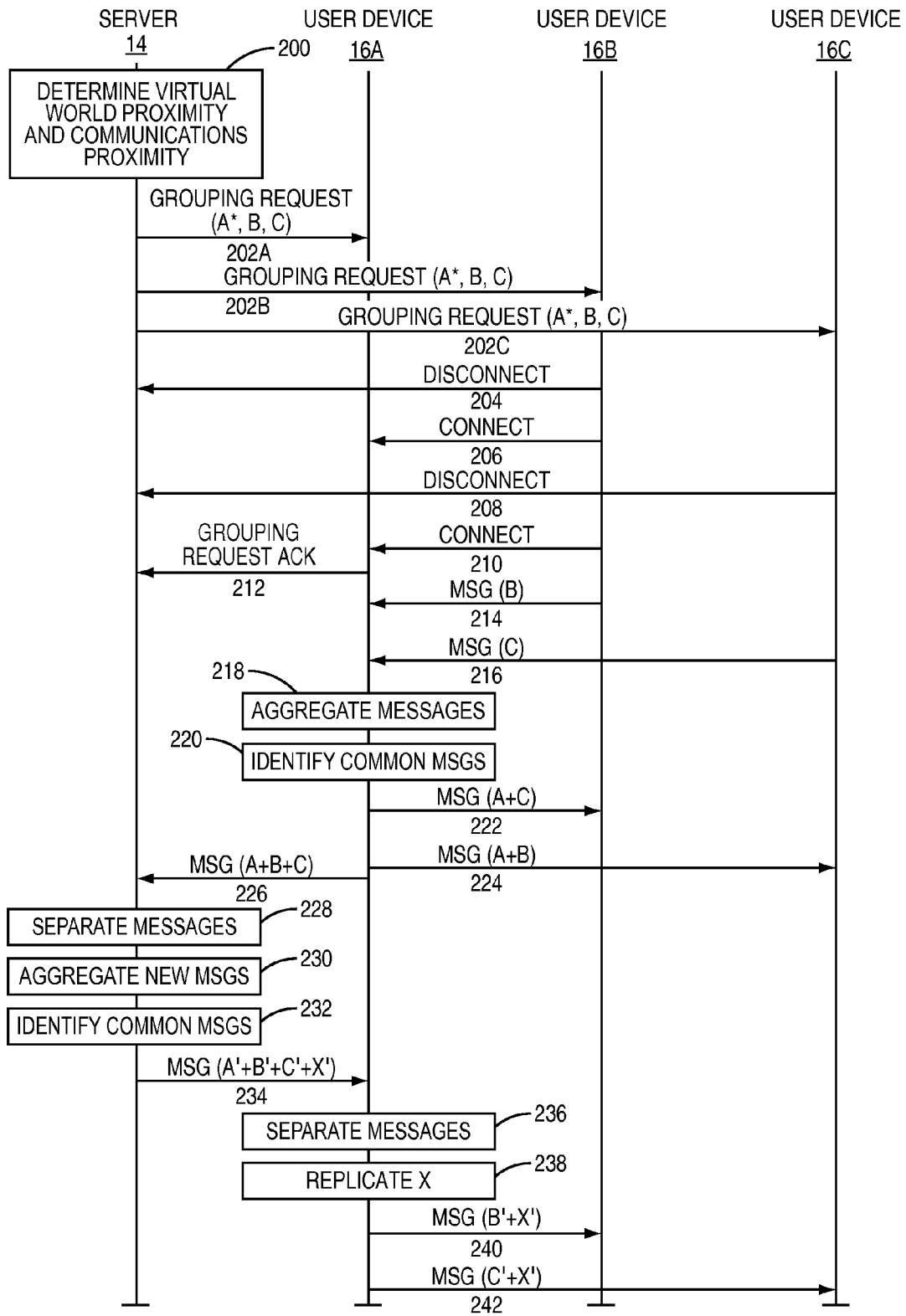
FIG. 4 is a communication flow diagram illustrating a process for grouping user devices based on dual proximity according to another embodiment of the present invention.

FIG. 4 is a communication flow diagram illustrating a process for grouping user devices 16 based on dual proximity according to another embodiment of the present invention. The server 14 determines that certain user devices 16, referred to herein for the purposes of FIG. 4 as user devices 16A, 16B, and 16C, are in communications proximity of one another, and that their respective avatars 20 are in virtual world proximity of one another (step 200). It is determined that the user device 16A should be designated as the master client. The server 14 sends a grouping request to the user devices 16A, 16B, and 16C and indicates through the use of a flag, such as an asterisk, in the grouping request that the user device 16A will be designated as the master client, and that the user devices 16B and 16C will be the slave clients (steps 202A, 202B, 202C). The user device 16B initiates a disconnect with the server 14 (step 204), and then connects to the master client (step 206). Similarly, the user device 16C initiates a disconnect with the server 14 (step 208), and connects to the master client (step 210). According to another embodiment of the present invention, the user devices 16B and 16C maintain their respective connections with the server 14, but do not utilize the connections so long as the respective user device 16B and 16C remains part of a client cluster, or utilize the respective connection for a particular but limited purpose, such as receipt of 'keep-alive' messages, or for verification by the server 14 of message delivery via the master client.

The user device 16A, recognizing that each of the slave clients has issued a connect to the user device 16A, sends a grouping request acknowledgement (ACK) to the server 14 to indicate successful formation of the client cluster (step 212). Over a period of time, or a round, the user device 16B and the user device 16C send messages to the user device 16A (steps 214 and 216). The designation in FIG. 4 of a message (MSG) combined with a letter indicates the particular user device which either originated the message or for which the message is destined, as appropriate for the context in which it is used. The user device 16A aggregates, or combines, the component, or individual, messages into a composite message (step 218). The user device 16A also identifies all common messages, i.e., those messages that will be sent to all user devices 16 in the client cluster, from the user devices 16B and 16C (step 220) and sends to the user device 16B those messages not originating from the user device 16B (step 222) and likewise sends to the user device 16C those messages not originating from the user device 16C (step 224). The user device 16A then sends the composite message to the server 14 (step 226). According to one embodiment of the present invention, the server 14 examines the component messages in the composite message and validates the component messages by sending an acknowledgement to the user device 16A. The user device 16A in turn sends an acknowledgement to the user devices 16B and 16C, which, upon receipt of the acknowledgement, will process the messages (not shown). If the server 14 determines that one or more messages are invalid, a non-acknowledgement can be sent to the user device 16A, which can be propagated to the user devices 16B and 16C to inform the user devices 16B and 16C that the messages should not be processed (not shown).

The server 14 separates the composite message into its component messages (step 228). The server 14 then aggregates, or combines, new messages that the server 14 received from other user devices 16 that must be sent to the clustered devices (step 230), and identifies all messages that are common to all, or a subset of, the user devices 16A, 16B, and 16C (step 232). The server 14 inserts only a single copy of any such common messages into the composite message. The server 14 sends the composite message to the user device 16A (step 234). The user device 16A receives the composite message, separates from the composite message all component messages (step 236), and replicates any message that is destined for more than one user device 16 (step 238). The user device 16A then sends the appropriate component messages to the respective user devices 16B and 16C (steps 240 and 242). It should be understood that while the steps herein have been described sequentially, much of the message processing can occur in parallel.

Figure 5:
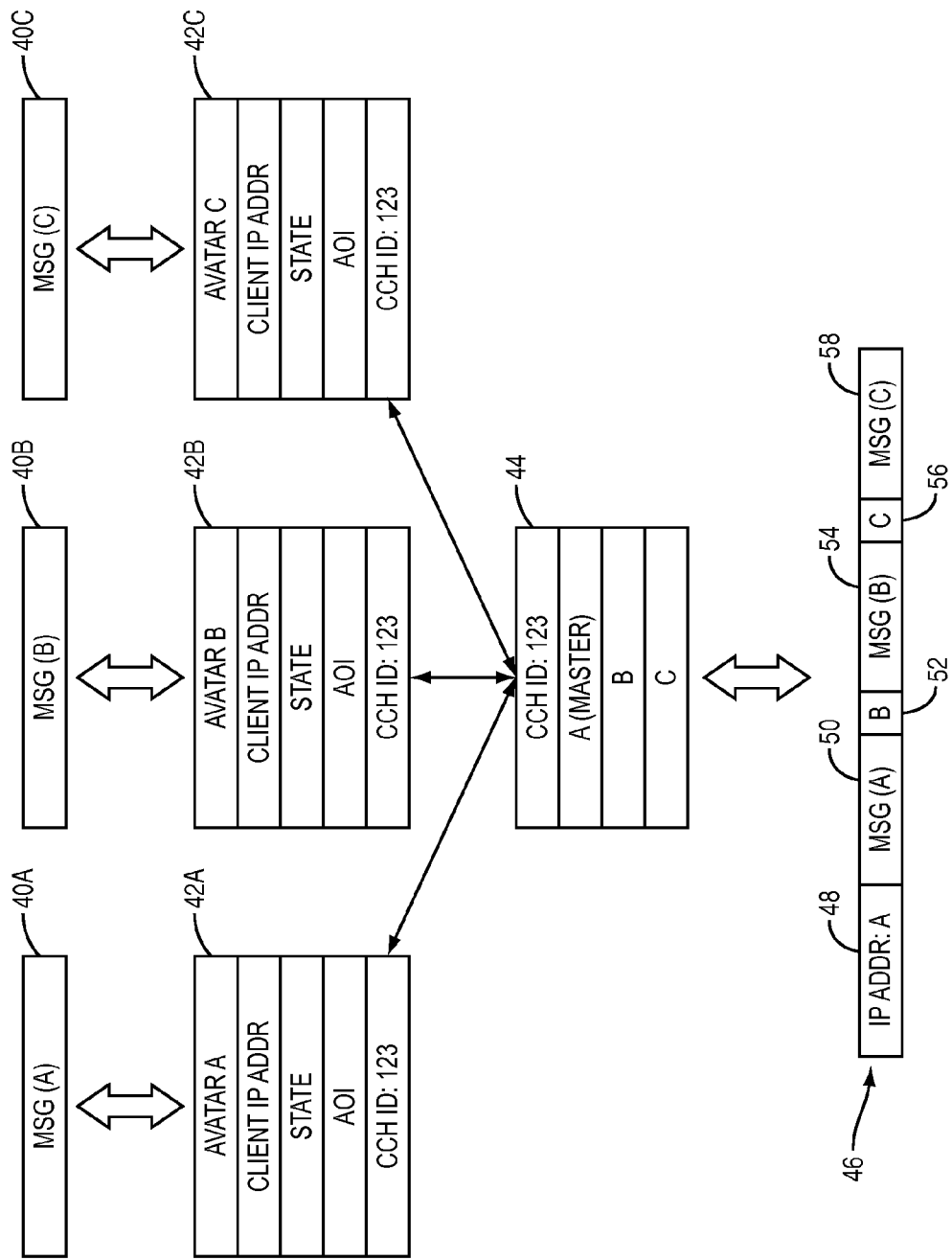
FIG. 5 is a block diagram illustrating consolidating component messages into a composite message according to one embodiment of the present invention.

FIG. 5 is a block diagram illustrating data structures useful for consolidating component messages into a composite message according to one embodiment of the present invention. FIG. 5 will be discussed in the context of the server 14 creating a component message from a plurality of messages received from user devices 16 that are not a part of the client cluster for which the composite message is being created. In this context, the data structures discussed herein with respect to the consolidation of a composite message from component messages typically resides on the server 14. The same or a similar process can also be used by the master client to consolidate messages from the clustered devices to create a component message suitable for sending to the server 14. However, in such a context, the data structures discussed herein with respect to the consolidation of a composite message from component messages typically resides on the master client. The process discussed herein assumes the simulator software was developed using an object-oriented software architecture, but it should be understood that the invention described herein can be implemented in any other suitable programming architecture so long as the relationships between entities as discussed herein can be established and maintained.

Queues 40A, 40B, and 40C receive messages destined for particular user devices 16A, 16B, and 16C (not shown), respectively. Each of the queues 40A, 40B, and 40C contains a single message. Each queue 40A, 40B, and 40C is associated with a respective object 42A, 42B, and 42C, respectively, which represents the particular user device 16 for which the message is destined. The objects 42A, 42B, and 42C can contain fields such as a field identifying the avatar associated with the user device 16, a client IP address field, a state field, an area of interest (AOI) field, and a client cluster handler (CCH) identification field. The CCH identification field links the objects 42A, 42B, and 42C associated with the cluster clients to a CCH object 44. If the CCH identification field is null, or empty, the respective user device 16 may not be part of a client cluster. As indicated in the CCH object 44, the user device 16A associated with the object 42A has been designated as the master client, and the user devices 16B and 16C associated with the objects 42B and 42C, respectively, have been designated as slave clients. The CCH object 44 consolidates the individual messages coming from the objects 42A, 42B, and 42C into a composite message 46. The composite message 46 includes an IP address field 48 which designates the IP address of the master client, and a component message field 50 indicates that message (A) is destined for the master client. The IP address field 48 may be part of a Transmission Control Protocol (TCP) or User Datagram Protocol (UDP) packet used to encapsulate the other fields described herein. A sub-address field 52 identifies an address for the user device 16B, and a component message field 54 indicates that message (B) is destined for the user device 16B. A sub-address field 56 identifies an address field for the user device 16C, and a component message field 58 indicates that message (C) is destined for the user device 16C. In the example shown in FIG. 5, the composite message 46 has a relatively simple format which merely appends the messages destined for the respective user device 16 after the sub-address field identifying that particular user device 16. It should be apparent to those skilled in the art that the precise format of composite message 46 can differ depending on the particular simulator implementation.

Figure 6:
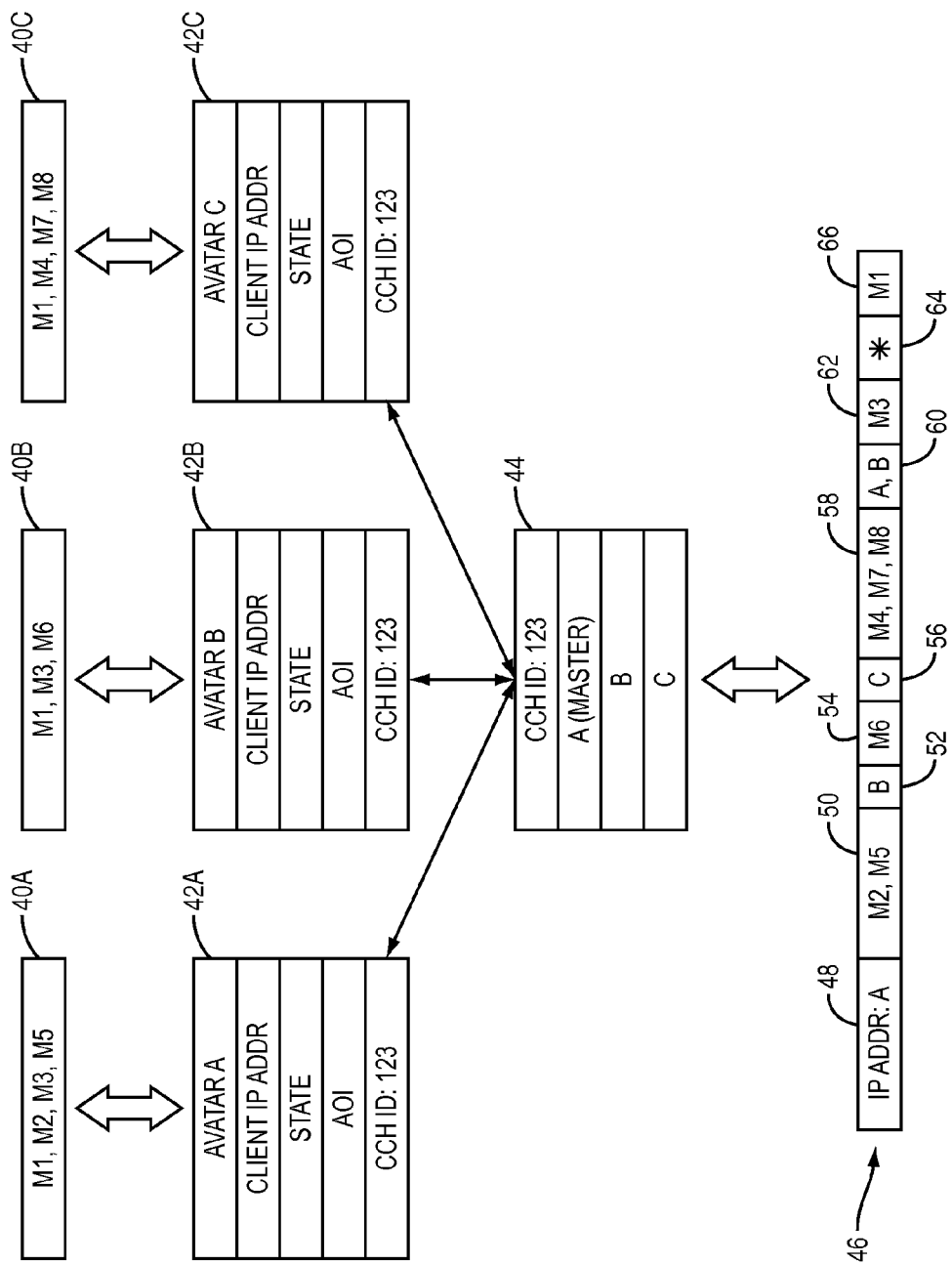
FIG. 6 is a block diagram illustrating consolidating component messages into a composite message according to another embodiment of the present invention.

FIG. 6 is a block diagram illustrating data structures useful for consolidating component messages into a composite message according to another embodiment of the present invention. The data structures, or objects, used in FIG. 6 are similar to those shown in FIG. 5; however, the queues 40A, 40B, and 40C now contain a plurality of messages in each respective queue 40A, 40B, and 40C, identified collectively as messages M1-M8. The messages M1-M8 were sent by one or more user devices 16 that are not part of the respective client cluster, but the messages M1-M8 must be delivered to one or more of the user devices 16 in the client cluster. The component message 46 contains the address fields 48, 52, and 56 discussed previously with respect to FIG. 5. However, in this example the server 14 identified common messages that were destined for more than one of the clustered devices, and the server 14 indicates to which clustered devices each common message should be sent in the composite message 46. Thus, multiple copies of the same message are eliminated, saving communications bandwidth. For example, a sub-address field 60 indicates that the message M3 in component message field 62 should be sent to the user devices 16A and 16B. A sub-address field 64 uses a flag, such as an asterisk, to indicate that the messages in message field 66, in this example the message M1, should be send to all user devices 16 in the client cluster.

Figure 7:
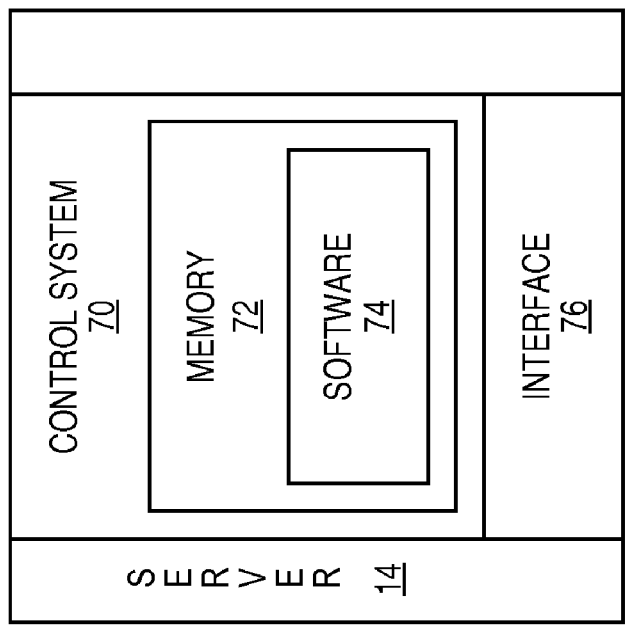
FIG. 7 is a block diagram illustrating a server according to one embodiment of the present invention.

FIG. 7 is a block diagram illustrating a server 14 according to one embodiment of the present invention. The server 14 includes a control system 70 coupled to a memory 72. The memory 72 can include software 74, which is capable of carrying out the functionality described herein with respect to the server 14. The server 14 can communicate to the user devices 16 via the network 18 through an interface 76.

Figure 8:
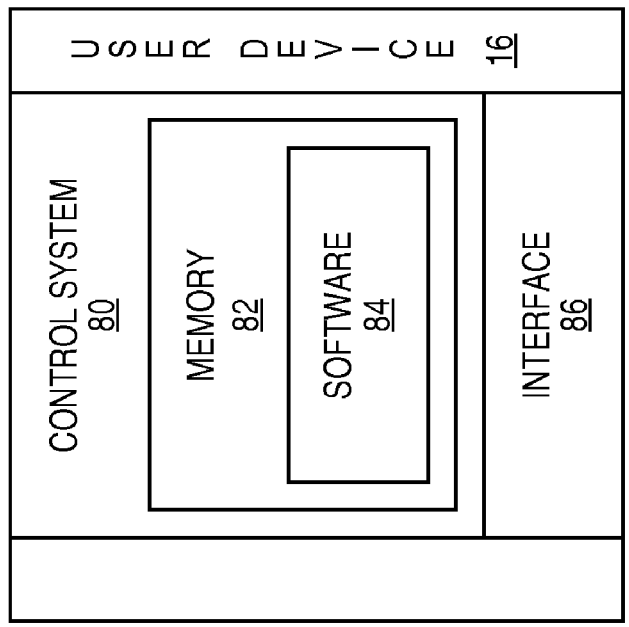
FIG. 8 is a block diagram illustrating a user device according to one embodiment of the present invention.

FIG. 8 is a block diagram illustrating a user device 16 according to one embodiment of the present invention. The user device 16 includes a control system 80 which is coupled to a memory 82. The memory 82 includes software 84 embodying the functionality described herein for carrying out the functionality of the user device 16. The user device 16 can communicate over the network 18 via an interface 86.

The invention described herein can be implemented in hardware, firmware, software, or any combination thereof. According to one embodiment of the present invention, the invention comprises a computer-usable medium having computer-readable instructions stored thereon for execution by a processor to perform the functionality described herein. The computer-usable medium can comprise any suitable medium for storing computer instructions, such as, but not limited, to a compact disc (CD), a digital video disc (DVD), a hard disk drive, RAM, or any other memory device suitable for storing computer instructions.

According to one embodiment of the present invention, the user devices 16 in a client cluster alternate roles as the master client for that client cluster. For example, after a predetermined amount of time, one of the slave clients may be designated as the master client. The existing master client transfers to the slave client any information necessary for the slave client to serve as the master client, and notifies the server 14 of the change in roles. Alternately, the role of master client could be determined based on a context in the virtual environment 12. For example, a user device 16 associated with an avatar 20 that is in grave danger may be given the role of master client to ensure that the user device 16 receives any related messages as quickly as possible. Each user device 16 could maintain a connection to the server 14, but not utilize the connection until that particular user device 16 took on the role of the master client. Alternating the user devices 16 that serve as the master client can ensure that any fees associated with network communication charges incurred by the master client are more equitably spread across the various users of the user devices 16 in the client cluster, and can ensure that the user devices 16, if running on battery power, use similar amounts of battery power since the processing requirements of a master client are greater than those of a slave client.

Those skilled in the art will recognize improvements and modifications to the preferred embodiments of the present invention. All such improvements and modifications are considered within the scope of the concepts disclosed herein and the claims that follow.

What is claimed is:

1. A method for grouping devices based on proximity, comprising:
    determining that a first avatar associated with a first device is in a virtual world proximity of a second avatar associated with a second device;
    determining that the first device is in a communications proximity of the second device where the first device is determined to be in the communications proximity of the second device when the communications proximity is below a threshold;
    initiating a proximity cluster session between the first device and the second device when the first avatar is in the virtual world proximity of the second avatar and the first device is in the communications proximity of the second device;
    identifying one of the first device and the second device as a master device and another of the first device and the second device as a slave device;
    providing a plurality of slave devices;
    combining data destined for the master device and data destined for the slave device into a composite message; and
    sending the composite message to the master device, wherein combining the data destined for the master device and the data destined for the slave device into the composite message and sending the composite message to the master device comprises determining if data destined for one of the plurality of slave devices is identical to data destined for another of the plurality of slave devices and putting a single occurrence of the data destined for the one of the plurality of slave devices into the composite message and indicating in the composite message that the data destined for the one of the plurality of slave devices should be forwarded to the one of the plurality of slave devices and the another of the plurality of slave devices after the message is received at the master device.

2. The method of claim 1 further comprising forwarding the data destined for the slave device to the slave device from the master device.

3. The method of claim 2 wherein forwarding the data destined for the slave device to the slave device from the master device comprises sending the composite message from the master device to the slave device.

4. The method of claim 2 wherein forwarding the data destined for the slave device to the slave device from the master device comprises determining a component in the composite message that is destined for the slave device, separating the component into a separate message, and forwarding the separate message to the slave device.

5. The method of claim 1 further comprising terminating a connection between a server and the slave device, and establishing a connection between the slave device and the master device.

6. The method of claim 1 wherein the virtual world proximity is determined by a criterion selected from one of a virtual zone, an area of interest, and a virtual world distance between the first avatar and the second avatar.

7. The method of claim 1 wherein determining that the first avatar associated with the first device is in the virtual world proximity of the second avatar associated with the second device is performed by a server.

8. The method of claim 1 wherein the communications proximity is determined by a criterion selected from one of a geographic area, a latency between the first device and the second device, a physical distance between the first device and the second device, and a local area network proximity.

9. The method of claim 1 further comprising receiving, at the master device, data from the plurality of slave devices, combining the data from the plurality of slave devices into a second composite message, and forwarding the second composite message to a server.

10. The method of claim 1 further comprising receiving, at the master device, data from the plurality of slave devices, and forwarding respective portions of the data from the plurality of slave devices to the plurality of slave devices that did not send the respective portions of the data from the plurality of slave devices to the master device.

11. The method of claim 1 further comprising receiving, at the master device, data from the plurality of slave devices, forwarding respective portions of the data from the plurality of slave devices to the plurality of slave devices that did not send the respective portions of the data from the plurality of slave devices to the master device, combining the data from the plurality of slave devices into a second composite message, and forwarding the second composite message to a server.

12. The method of claim 1 wherein identifying one of the first device and the second device as the master device and the other of the first device and the second device as the slave device comprises determining which of the first device and the second device has a lowest network latency.

13. The method of claim 1 wherein determining that the first device is in the communications proximity of the second device is performed before determining that the first avatar associated with the first device is in the virtual world proximity of the second avatar associated with the second device.

14. The method of claim 1 wherein determining that the first avatar associated with the first device is in the virtual world proximity of the second avatar associated with the second device comprises determining, by the first device, a first location of the first avatar and a second location of the second avatar, and determining that a distance between the first location and the second location constitutes the virtual world proximity, and communicating to a server that the first avatar is in the virtual world proximity of the second avatar.

15. The method of claim 1 wherein determining that the first device is in the communications proximity of the second device comprises determining, by a server, a first location of the first device and a second location of the second device, and determining that a distance between the first location and the second location constitutes the communications proximity.

16. A non-transitory computer storage medium having computer-readable instructions stored thereon for execution by a processor to perform a method comprising:
   determining that a first avatar associated with a first device is in a virtual world proximity of a second avatar associated with a second device;
   determining that the first device is in a communications proximity of the second device where the first device is determined to be in the communication proximity of the second device when the communications proximity is below a threshold;
   initiating a proximity cluster session between the first device and the second device when the first avatar is in the virtual world proximity of the second avatar and the first device is in the communications proximity of the second device;
   identifying one of the first device and the second device as a master device and another of the first device and the second device as a slave device;
   providing a plurality of slave devices;
   combining data destined for the master device and data destined for the slave device into a composite message; and
   sending the composite message to the master device, wherein combining the data destined for the master device and the data destined for the slave device into the composite message and sending the composite message to the master device comprises determining if data destined for one of the plurality of slave devices is identical to data destined for another of the plurality of slave devices and putting a single occurrence of the data destined for the one of the plurality of slave devices into the composite message and indicating in the composite message that the data destined for the one of the plurality of slave devices should be forwarded to the one of the plurality of slave devices and the another of the plurality of slave devices after the message is received at the master device.

17. An apparatus for grouping user devices based on proximity, comprising:
   a network interface adapted to interface with a network; and
   a control system coupled to the network interface and operative to:
      determine that a first avatar associated with a first device is in a virtual world proximity of a second avatar associated with a second device;
      determine that the first device is in a communications proximity of the second device where the first device is determined to be in the communications proximity of the second device when the communications proximity is below a threshold;
      initiate a proximity cluster session between the first device and the second device when the first avatar is in a virtual world proximity of the second avatar and the first device is in the communications proximity of the second device;
      identify one of the first device and the second device as a master device and another of the first device and the second device as a slave device;
      provide a plurality of slave devices;
      combine data destined for the master device and data destined for the slave device into a composite message; and
      send the composite message to the master device, wherein combining the data destined for the master device and the data destined for the slave device into the composite message and sending the composite message to the master device comprises determining if data destined for one of the plurality of slave devices is identical to data destined for another of the plurality of slave devices and putting a single occurrence of the data destined for the one of the plurality of slave devices into the composite message and indicating in the composite message that the data destined for the one of the plurality of slave devices should be forwarded to the one of the plurality of slave devices and the another of the plurality of slave devices after the message is received at the master device.

18. An apparatus comprising:
   a network interface adapted to interface with a network; and
   a control system coupled to the network interface and operative to:
      receive a first composite message from a server, the first composite message comprising data destined for the apparatus and data destined for a plurality of slave devices, wherein the apparatus is within a communications proximity below a threshold of the plurality of slave devices and an avatar associated with the apparatus is within a virtual world proximity of an avatar associated with each of the plurality of slave devices such that the apparatus and the plurality of slave devices are grouped together based on the virtual world proximity of the avatars and the communications proximity of the apparatus and the slave devices, wherein the composite message indicates therein that the data destined for a one of the plurality of slave devices and another of the plurality of slave devices should be forwarded to the one of the plurality of slave devices and the another of the plurality of slave devices after the message is received at the apparatus;
      separate the data, from the first composite message having data destined for the plurality of slave devices, into component messages destined for slave devices of the plurality of slave devices;
      forward the component messages to the slave devices of the plurality of slave devices;

receive a message containing data from each of the plurality of slave devices;
form a second composite message comprising the data from each of the plurality of slave devices and data from the apparatus; and
send the second composite message to the server.

19. The apparatus of claim 18 wherein the control system is further operative to:

determine which of the respective messages originated from which of the plurality of slave devices; and
send to each slave device of the plurality of slave devices one or more of the messages that did not originate from the respective one of the plurality of slave devices.

\* \* \* \* \*